(12) United States Patent
Larsen

(10) Patent No.: US 7,087,167 B2
(45) Date of Patent: Aug. 8, 2006

(54) SANITARY FILTRATION PLANT WITH HELICAL FILTER ELEMENTS

(75) Inventor: Knud Verner Larsen, Maribo (DK)

(73) Assignee: Alfa Laval Nakskov A/S, Nakskov (DK)

( * ) Notice: Subject to any disclaimer, the term of this patent is extended or adjusted under 35 U.S.C. 154(b) by 370 days.

(21) Appl. No.: 10/450,455

(22) PCT Filed: Dec. 19, 2001

(86) PCT No.: PCT/DK01/00837

§ 371 (c)(1),
(2), (4) Date: Jun. 19, 2003

(87) PCT Pub. No.: WO02/051529

PCT Pub. Date: Jul. 4, 2002

(65) Prior Publication Data

US 2004/0026310 A1 Feb. 12, 2004

(30) Foreign Application Priority Data

Dec. 27, 2000 (DK) .......................... PA 2000 01936

(51) Int. Cl.
*B01D 63/10* (2006.01)

(52) U.S. Cl. ............................ 210/321.83; 210/321.74; 210/321.85; 210/541; 55/483; 55/498; 285/95

(58) Field of Classification Search ................ 210/232, 210/321.74, 321.76, 321.83, 321.85, 345–347, 210/494.1, 494.3, 497.1, 541; 55/498, 483; 285/95

See application file for complete search history.

(56) References Cited

U.S. PATENT DOCUMENTS

| | | | |
|---|---|---|---|
| 3,928,204 A | | 12/1975 | Thomas ...................... 210/232 |
| 4,028,250 A | * | 6/1977 | Loft ........................... 210/259 |
| 4,237,010 A | | 12/1980 | Zimmerly ................... 210/232 |
| 4,296,951 A | * | 10/1981 | Zimmerly ..................... 285/95 |
| 4,517,085 A | | 5/1985 | Driscoll et al. ............. 210/232 |
| 4,802,982 A | * | 2/1989 | Lien ........................... 210/247 |
| 5,149,433 A | * | 9/1992 | Lien ........................... 210/641 |
| 5,647,329 A | * | 7/1997 | Bucci et al. ................. 123/509 |
| 5,817,235 A | * | 10/1998 | Tortosa ....................... 210/232 |

FOREIGN PATENT DOCUMENTS

EP  0 383 146  8/1990

* cited by examiner

*Primary Examiner*—Joseph Drodge
(74) *Attorney, Agent, or Firm*—Jacobson Holman PLLC

(57) ABSTRACT

A sanitary filtration plant including an oblong, tubular pressure vessel having one or more helical filter elements. Each helical filter element has a spiral-wound filter member and a central tube and, at an outlet end, a supporting structure formed as a wheel with a hub, spokes and a rim. The plane side of the downstream face of each supporting structure is provided with a plurality of recesses that are positioned between an opening between the spokes and the external periphery of the rim and extend circumferentially so as to be substantially concentric with said rim.

10 Claims, 2 Drawing Sheets

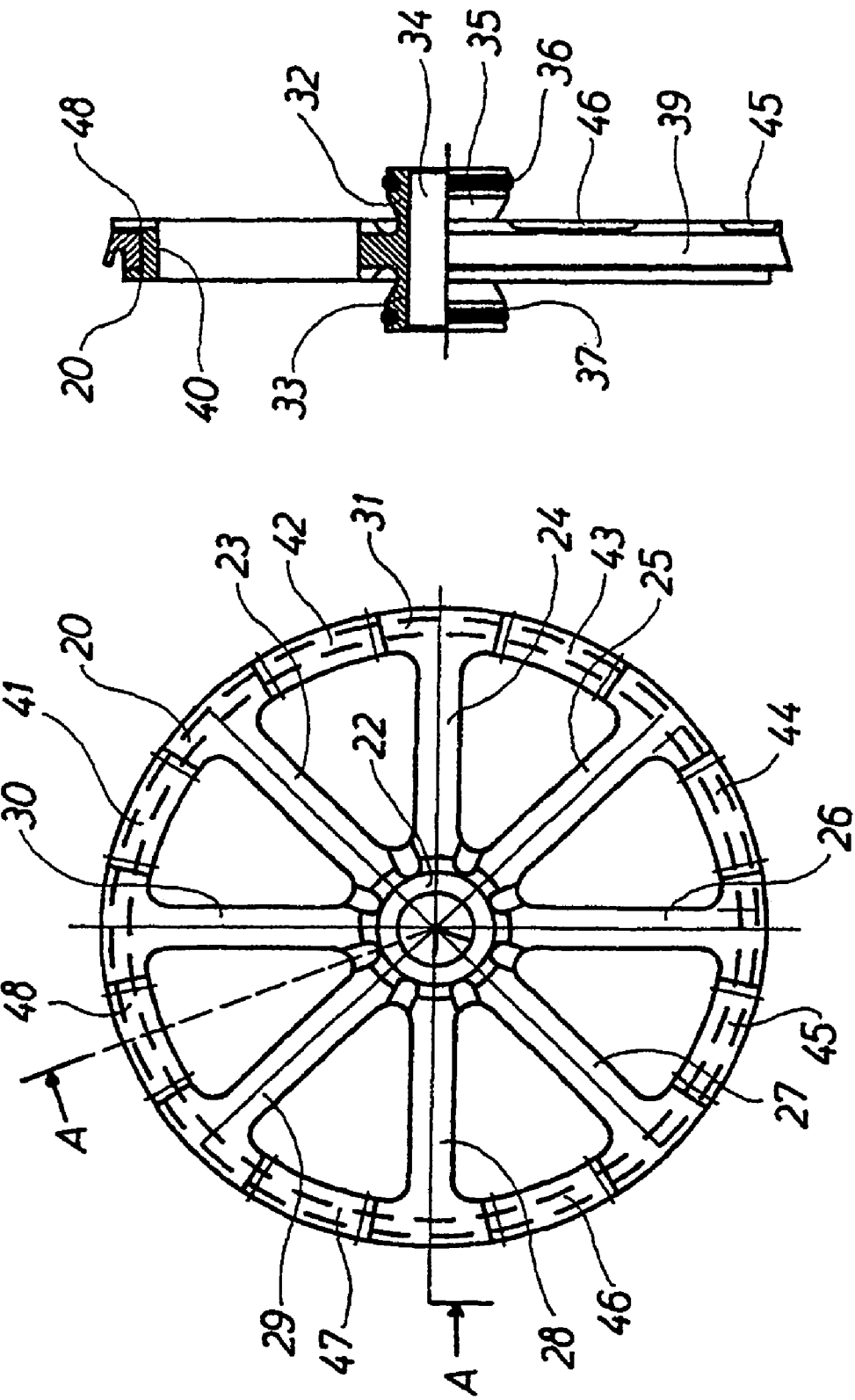

SANITARY FILTRATION PLANT WITH HELICAL FILTER ELEMENTS

This is a nationalization of PCT/DK01/00837 filed Dec. 19, 2001 and published in English.

TECHNICAL FIELD

The invention relates to a sanitary filtration plant comprising an oblong, tubular pressure vessel, which includes one or more helical filter elements, each helical filter element comprising a spiral-wound filter member and a central tube as well as a supporting means at one end which represents the outlet end while the plant is operating, said supporting means being in form of a wheel with a hub, spokes and rim and centrally being provided with a transition member which is adapted to ensure a sealing flow connection between adjacent ends of adjacent central tubes, and where each supporting means comprises plane sides for abutment against the ends of the filter members of the adjacent respective helical filter element(s) and along the external periphery is provided with a sealing means for a sealing abutment against the inner side of the pressure vessel. The invention relates furthermore to a supporting means to be used in such a sanitary filtration plant.

BACKGROUND ART

Sanitary filtration plants of the above type are known which comprise joined helical filter elements connected in series and mounted inside a pressure pipe, and where the product in question passes through the filter member while subjected to a suitable pressure difference. From the filter member, the permeate flows into the connected central tubes and leaves said tubes while separated from the concentrate. The concentrate passes through the filter member and leaves the pressure pipe while separated from the permeate. The helical filter elements can be of a length of approximately 0.5 to 1.0 m and have a tendency to be subjected to an axial displacement of the filter member relative to the central tube, viz. a so-called telescoping. Therefore, supporting means are arranged between the helical filter elements in order to counteract said displacement, said supporting means being so-called anti-telescoping devices, viz. ATD's. These supporting means also serve to ensure that the product to be filtered does not pass the filter elements freely between the external periphery thereof and the inner side of the tubular pressure vessel as a slit is provided at this location. This slit originates from an overdimensioning of the pressure vessel and allows an easy mounting and replacement of the filter elements. The latter prevention of the free flow through this slit is enhanced by the supporting means comprising a sealing means along the external periphery.

A filtration device with supporting means of a similar type is known from U.S. Pat. No. 4,517,085. However, this helical filtration device is not suited for use as a sanitary filtration plant.

A sanitary filtration plant used inter alia within the dairy, the medicine and the food-stuff industry presents very high requirements to the hygiene. A continuous use of a sanitary filtration plant often necessitates a cleaning, such as once or twice a day, whereby a cleaning fluid passes through the plant. It is important in connection with such a cleaning process that residues of the product in question are removed.

BRIEF DESCRIPTION OF THE INVENTION

The object of the invention is to provide a sanitary filtration plant which ensures such an efficient cleaning.

This object is according to the invention obtained by the filtration plant described in the introduction being characterised in that a plurality of recesses extending between an opening between spokes and the external periphery of the rim is provided in the plane side of the supporting means being the downstream face while the plant is operating.

As a result, a controlled flow is ensured of both the product to be subjected to a filtration and the cleaning fluid on the downstream face of the supporting means in such a manner that a flow of the fluid in question is carried directly into the area behind the sealing means of the supporting means, whereby this area behind the sealing means is washed with the result that a replacement of both the product to be subjected to a filtration and the cleaning fluid is ensured. In addition, the pressure prevailing inside the slit on the outer side of each helical filter element is equalized along the entire length of said helical filter element with the result that the efficiency of the plant is increased and the above telescoping is minimized.

According to the invention it is particularly advantageous when a recess extends from each opening between the spokes of the supporting means.

The invention relates also to a supporting means to be used in a sanitary filtration plant of the above type. This supporting means is according to the invention characterised in that it is provided with a plurality of recesses in the plane side being the downstream face while the plant is operating, said recesses extending between an opening between the spokes and the external periphery of the rim.

BRIEF DESCRIPTION OF THE DRAWINGS

The invention is explained in greater detail below with reference to the accompanying drawings, in which FIG. 2 illustrates on a larger scale the supporting means, seen from the downstream face thereof, and FIG. 3 is a sectional view taken along the line A—A of FIG. 2 of the supporting means shown in FIG. 2.

BEST MODE FOR CARRYING OUT THE INVENTION

Figure 1:
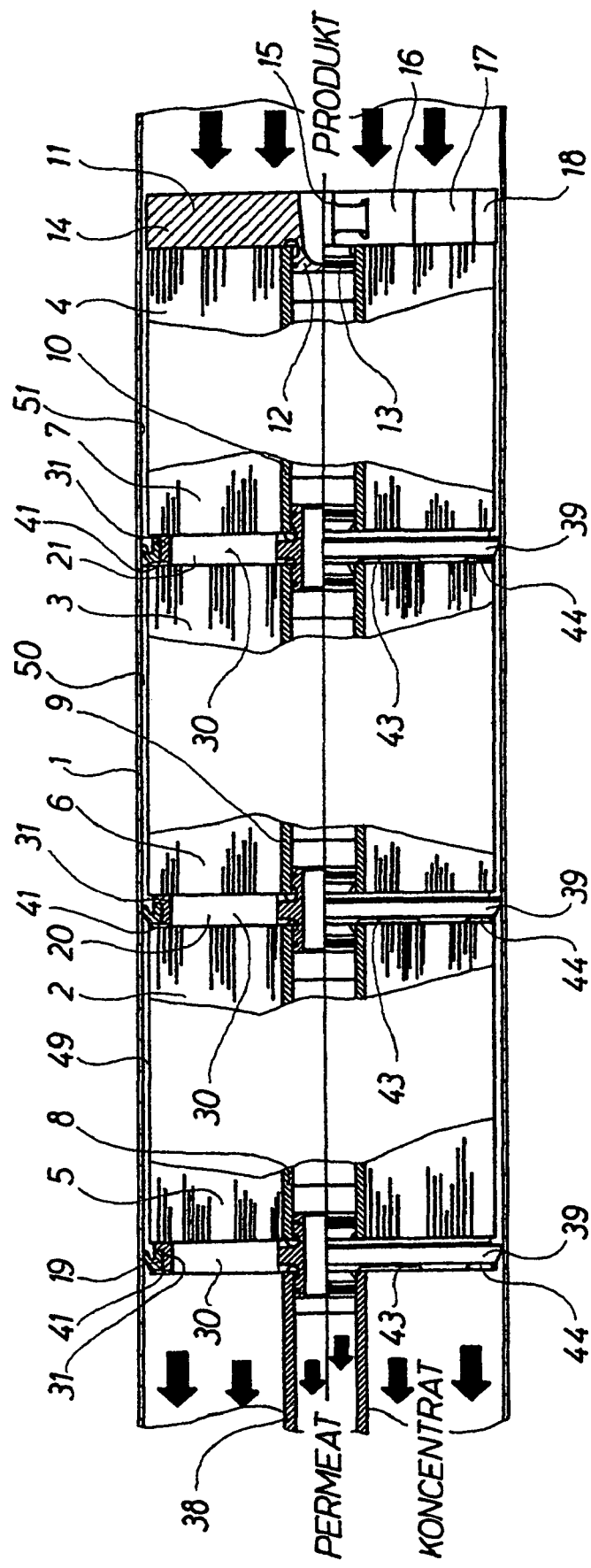
FIG. 1 is a cross-sectional view through a portion of a filtration plant according to the invention, whereby parts have been omitted for the sake of clarity, and is a sectional view taken along the central line and in form of solid lines below said central line through the supporting means provided between the helical filter elements.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The filtration plant shown in FIG. 1 comprises a pressure pipe 1, in which three helical filter elements 2, 3 and 4 are mounted. Each helical filter element 2, 3 and 4 comprises a spiral-wound filter member 5, 6 and 7, respectively, arranged about a central tube 8, 9 and 10, respectively. These helical filter elements 2 to 4 are of a conventionally known type.

A plug means 11 is provided at the right end of the row of helical filter elements 2 to 4 shown in the drawing, said plug means 11 comprising a centrally projecting projection 12 with an external seal 13 for sealingly engaging and closing the central tube 10. This plug means is of a conventionally known type with radially projecting wings 14, 15, 16, 17 and 18 for a supporting abutment against the adjacent end of the filter member 7.

A supporting means 19, 20 and 21 is arranged between the helical filter elements 2 to 4 and at the left end of the row of said filter elements 2 to 4 in the drawing. As shown in FIGS. 2 and 3, each supporting means comprises a hub 22, radial spokes 23 to 30 as well as a rim 31 with the result that these supporting means are of a wheel-like shape. A projecting projection 32, 33 is centrally arranged on each side of the supporting means, said projections 32, 33 defining a through bore 34 centrally arranged in the hub. These projections serve to form a transition means 35 between abutting ends of the central tube of the respective helical filter elements 2 to 4, said projecting projections 32 and 33 sealingly engaging said central tubes 8 to 10 by means of a circumferential sealing means 36, 37, respectively.

The transition means at the left end of the row of filter elements 2 to 4 shown in FIG. 1 co-operates with a centrally arranged tube 38 serving to carry the permeate away from the filtration plant.

FIG. 3 illustrates particularly clearly that the supporting means 19, 20 and 21 externally comprise a circumferential lip seal 39 which is received and vulcanized in a circumferential groove 40.

As particularly clearly shown in FIGS. 2 and 3, but also in FIG. 1, radial recesses 41 to 48 are provided on one side of each supporting means 19 to 21, and in greater detail on the side of the supporting means forming the downstream face of said supporting means while the filtration plant is operating. These recesses 41 to 48 extend between their respective openings between the spokes 23 to 30 and the outer side of the rim 31.

A product to be filtered by means of the filtration plant is carried through the row of filter elements 2, 3 and 4, cf. the arrows at the right end of FIG. 1. The permeate or the filtrate leaves the filter members 5 to 7 in a conventionally known manner and flows into the central tubes 8, 9 and 10 and then out of said tubes through the tube 38 to the left of FIG. 1. The remaining portion of the product to be filtered, viz. the concentrate, leaves also to the left so as to be drained off in a conventionally known manner.

As illustrated in FIG. 1, a circumferential slit 49, 50 and 51 is provided between the individual filter elements 2 to 4 and the surrounding pressure pipe 1. These slits are present in order to facilitate the mounting and the replacement of the filter elements 2 to 4. A portion of the product to be filtered does, of course, pass round the first filter element 4, but is prevented from flowing directly from the surrounding slit 51 and further to the succeeding slit 50 by means of the lip seal 39 on the supporting means 21 arranged therebetween. The presence of the lip seal 39 forces the product through the filter member 7 of the helical filter element 4, and the concentrated portion thereof leaves the filter member 7 and flows between the spokes of the supporting means 21 and into the filter member 6 of the succeeding filter element 3. However, a portion of the concentrate flows directly through the recesses 41 to 48 and directly into the surrounding slit 50. The same procedure takes place at the next supporting means 20. At the last supporting means 19, the concentrate is also forced into the filter member 5 of the filter element, where the portion not filtered off flows on in form of a concentrate.

Thus the recesses 41 to 48 on the rear side of the supporting means 19 to 21 ensure that fresh fluid is continuously fed to the area behind the respective lip seals 39 in such a manner that the fluid in said area is continuously replaced. The latter procedure is also carried out during the periodic cleaning processes, whereby a cleaning fluid is fed through the filtration plant.

The direct flow of fluid out through the recesses 41 to 48 implies during the operation of the filtration plant that a constant and uniform pressure is maintained in the slits 49 to 51 between the helical filter elements 2 to 4 and the pressure pipe 1, and consequently the load on the helical filter elements 2 to 4 is equalized along the entire length thereof. The direct filling of the slits through the recesses implies furthermore that these slits are not to be filled with fluid which first must pass through portions of each helical filter element 2 to 4. Thus the presence of the recesses results in an optimized effect of the helical filter elements and consequently in a prolonged life of said helical filter elements.

The invention has been described with reference to a preferred embodiment. Many modifications can be carried out without thereby deviating from the scope of the invention. The plant can for instance comprise only one helical filter elements or more helical filter elements arranged in parallel.

The recesses 41 to 48 can for instance be of a varying shape and length in the circumferential direction. Outside the recesses 41 to 48, the rim 31 and the spoke 23 to 30 are substantially plane both on the front side and on the rear side of the supporting means 19 to 21 with the result that they directly abut the ends of the adjacent helical filter elements.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A sanitary filtration plant comprising: an oblong, tubular pressure vessel defining a pressure pipe and including at least one helical filter element having a spiral-wound filter member, at least one slit between a respective filter element and the pipe and a central tube;
    a supporting structure at an outlet end of said helical filter element with respect to plant operation, said supporting structure being in form of a wheel with a hub, spokes and a rim and having plane sides for abutment against the outlet end of the filter member, said supporting structure further being provided along an external periphery thereof with a sealing element for sealing abutment against an inner side of the pressure vessel and a plurality of recesses positioned between at least one opening between the spokes and an external periphery of said rim and fluidly communicating with the respective slit, said recesses being provided in the plane side of the supporting structure on a downstream face thereof while the plant is operating.

2. The sanitary filtration plant according to claim 1, wherein a recess extends circumferentially adjacent each opening between the spokes of the supporting structure.

3. The supporting structure according to claim 1, wherein said supporting structure further includes a transition element adjacent said hub which is adapted to ensure a sealing flow connection between adjacent ends of additional central tubes.

4. The supporting structure according to claim 1, wherein said supporting structure further includes a sealing element along an external periphery of said rim.

5. The supporting structure according to claim 1, wherein a plurality of said supporting structures are used in a sanitary filtration plant having a plurality of helical filter elements arranged in series, each of said supporting structures being in abutment with a downstream face of a respective helical filter element.

6. The supporting structure according to claim 5, further comprising a transition element adjacent each hub of said plurality of supporting structure, said transition element being adapted to ensure a sealing flow connection between adjacent ends of central tubes of said plurality of helical filter elements.

7. A sanitary filtration plant comprising: an oblong, tubular pressure vessel defining a pressure pipe and having a plurality of helical filter elements arranged adjacent one another, each helical filter element including a spiral-wound filter member, a plurality of slits between respective filter elements and the pipe, and a central tube;
   a plurality of supporting structures at outlet ends said helical filter elements with respect to plant operation, respectively, each of said supporting structures being in the form of a wheel with a hub, spokes and a rim, said supporting structures having plane sides for abutment against said outlet ends of the filter members of the respective adjacent helical filter elements, each of said supporting structures having a plurality of recesses positioned between at least one opening between the spokes and the external periphery of the rim and fluidly communicating with the respective slits, said recesses being provided the plane side of each supporting structure on a downstream face thereof while the plant is operating.

8. The sanitary filtration plant according to claim 7, wherein a recess extends circumferentially adjacent each opening between the spokes of each of said supporting structures.

9. The sanitary filtration plant according to claim 7, wherein said supporting structure is provided with a transition member adjacent said hub which is adapted to ensure a sealing flow connection between adjacent ends of adjacent central tubes of adjacent filter elements.

10. The sanitary filtration plant according to claim 7, further comprising a sealing element along an external periphery of said rim for sealing abutment against an inner side of the pressure vessel.

* * * * *